US007420890B2

(12) United States Patent  
Kurokawa (10) Patent No.: US 7,420,890 B2  
(45) Date of Patent: Sep. 2, 2008

(54) OBJECTIVE LENS ACTUATOR AND OPTICAL DISK APPARATUS

(75) Inventor: Kenya Kurokawa, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 615 days.

(21) Appl. No.: 11/175,403

(22) Filed: Jul. 7, 2005

(65) Prior Publication Data

US 2006/0007803 A1    Jan. 12, 2006

(30) Foreign Application Priority Data

Jul. 7, 2004    (JP) .............................. 2004-200646

(51) Int. Cl.  
*G11B 7/00* (2006.01)

(52) U.S. Cl. .................................................. 369/44.14

(58) Field of Classification Search ............. 369/44.14, 369/44.11, 44.15  
See application file for complete search history.

(56) References Cited

U.S. PATENT DOCUMENTS 7,266,055 B2 * 9/2007 Cho et al. ................ 369/44.14

FOREIGN PATENT DOCUMENTS

JP    2003-257056 A    9/2003

* cited by examiner

*Primary Examiner*—Nabil Z Hindi  
(74) *Attorney, Agent, or Firm*—Pillsbury Winthrop Shaw Pittman, LLP (57) ABSTRACT

An objective lens actuator of the present invention is an actuator capable of driving an objective lens which condenses a laser beam on an information recording surface of an optical disk, in each of a focusing direction, a tracking direction and a radial tilt direction. The actuator comprises a fixed unit including first and second magnets, and a moving unit which is arranged between the first and second magnets and which includes the objective lens, focusing coils, tracking coils, and a radial tilt coil. Each of the magnets is divided into four areas and being magnetized such that adjacent areas have opposite poles N and S, respectively. A direction of the magnetization is orthogonal to the focusing direction and tracking direction.

5 Claims, 11 Drawing Sheets

FIG. 6
Connection diagram of focusing coils

Connection diagram of tracking coils

FIG. 7

Connection diagram of radial tilt coils

---→ Coil current
━━▶ Lorentz force

OBJECTIVE LENS ACTUATOR AND OPTICAL DISK APPARATUS

CROSS-REFERENCE TO RELATED APPLICATIONS

This application is based upon and claims the benefit of priority from prior Japanese Patent Application No. 2004-200646, filed Jul. 7, 2004, the entire contents of which are incorporated herein by reference.

BACKGROUND OF THE INVENTION

1. Field of the Invention

This invention relates to an optical disk apparatus capable of recording and reproducing information on an optical disk and, more particularly, to an objective lens actuator capable of driving an objective lens which condenses a laser beam on an optical disk, in each of focusing direction, tracking direction and radial tilt direction.

2. Description of the Related Art

As is well known, recently, the technology of recording information in high density has been developed and optical disks having storage capacity of 4.7 GB (Giga Byte) in one single-sided layer have been widespread. Optical disks such as CD (Compact Disk) and the like are generally known as information storage mediums. Besides the CD, there are DVD (Digital Versatile Disk), HD (High Definition)-DVD, and the like as the optical disks.

When information is recorded on or reproduced from an optical disk, a laser beam is condensed on the recording surface of the disk and an optical beam spot follows information tracks on the optical disk. Moreover, the position and the angle of the objective lens are controlled such that the laser beam is applied to the recording surface of the disk at right angles even if the optical disk is warped.

Control of adjusting the position of the objective lens such that the laser beam is condensed on the recording surface of the disk is called focus control. Control of adjusting the position of the objective lens such that the optical beam spot follows the information tracks on the disk is called tracking control. Control of adjusting the angle of the objective lens such that the laser beam is applied to the recording surface of the disk at right angles is called tilt control. These controls are conducted by employing an objective lens actuator. As the technology of recording the information in high density on the optical disk becomes developed, the objective lens actuator is required to drive the disk in higher accuracy.

Jpn. Pat. Appln. KOKAI Publication No. 2003-257056 discloses a lens actuator using a magnet of bipolar magnetization in which a boundary of magnetization of the magnet is on a diagonal line of a coil.

In the magnetizing pattern disclosed in this document, the Lorentz force applied to the coil is deflected, an undesirable torque is generated and the tilt of the objective lens becomes great when the lens (lens holder) is driven. In addition, in the magnetizing pattern, since the magnitude of the magnetic field generated by the magnet is remarkably fluctuated within the range of movement of the actuator, the sensitivity of driving the actuator is largely varied.

BRIEF SUMMARY OF THE INVENTION

In an objective actuator according to an aspect of the present invention, a magnet of quadruple magnetization is used in which boundaries of magnetic poles cross each other. The direction of the boundaries corresponds to the focusing direction and tracking direction of the actuator. Even when the actuator is driven, tilt of an objective lens to the magnetic field is small. In addition, a focusing coil and a radial tilt coil are driven by quite independent mechanisms.

A driving force can be efficiently generated from a small magnet and a small coil. Moreover, the driving forces of the respective focusing coil, tracking coil and radial tilt coil can easily be adjusted independently of each other. In addition, tilt of an objective lens is small when the actuator is driven. Since the magnetizing pattern of the magnet is simple, mass production is facilitated.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be explained below with reference to the accompanying drawings.

Figure 1:
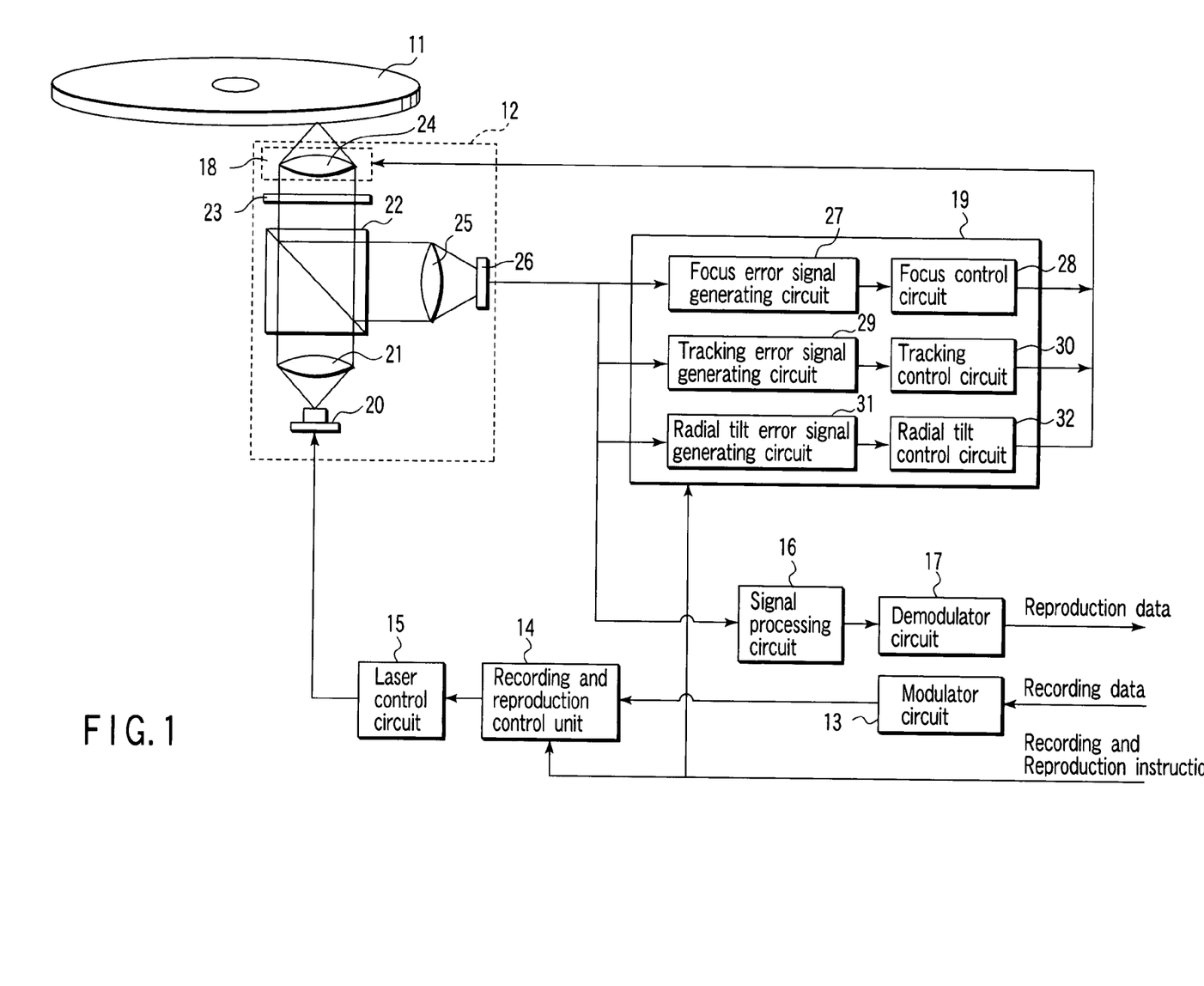
FIG. 1 is an illustration showing a structure of an optical disk apparatus to which an objective lens actuator according to the present invention is applied.

FIG. 1 shows an optical disk apparatus according to the present invention. The optical disk apparatus has a function of recording and reproducing information on an optical disk 11 such as CD, DVD, HD-DVD or the like.

The optical disk apparatus comprises an optical head 12, a modulator circuit 13, a recording and reproduction control unit 14, a laser control circuit 15, a signal processing circuit 16, a demodulator circuit 17, an objective lens actuator 18, and a lens actuator control unit 19.

The optical head 12 comprises a semiconductor laser 20, a collimate lens 21, a PBS (polarized beam splitter) 22, a quarter-wave plate 23, an objective lens 24, a condenser lens 25, and a photo detector 26.

The lens actuator control unit 19 comprises a focus error signal generating circuit 27, a focus control circuit 28, a tracking error signal generating circuit 29, a tracking control circuit 30, a radial tilt error signal generating circuit 31, and a radial tilt control circuit 32.

First, recording the information to the optical disk 11 by the optical disk apparatus is described. The modulator circuit 13 modulates recording information (data symbol) provided from a host in a predetermined modulation scheme to channel bit sequence. The channel bit sequence corresponding to the recording information is input to the recording and reproduction control unit 14.

A recording/reproduction instruction (recording instruction in this case) is input from the host to the recording and reproduction control unit 14. The recording and reproduction control unit 14 inputs a control signal to the objective lens actuator 18 and drives the optical head 12 such that an optical beam is appropriately condensed at a desired recording position. Moreover, the recording and reproduction control unit 14 supplies the channel bit sequence to the laser control circuit 15.

The laser control circuit 15 converts the channel bit sequence into a laser drive waveform to drive the semiconductor laser 20. The laser control circuit 15 conducts pulse drive of the semiconductor laser 20. In accordance with this, the semiconductor laser 20 generates a recording optical beam corresponding to a desired bit sequence.

The recording optical beam generated from the semiconductor laser 20 becomes a parallel beam at the collimate lens 21, which is made incident on the PBS 22 and passed there through. The optical beam passed through the PBS 22 is passed through the quarter-wave plate 23 and condensed on an information recording surface of the optical disk 11 by the objective lens 24.

The condensed recording optical beam is maintained under a condition that a most desirable optical beam spot is acquired on the information recording surface of the optical disk 11, under focus control conducted by the focus control circuit 28 and the objective lens actuator 18, tacking control conducted by the tracking control circuit 30 and the objective lens actuator 18, and radial tilt control conducted by the radial tilt control circuit 32 and the objective lens actuator 18.

Next, reproduction of the information on the optical disk 11 by the optical disk apparatus is described. A recording/reproduction instruction (reproduction instruction in this case) is input from the host to the recording and reproduction control unit 14. The recording and reproduction control unit 14 outputs a reproduction control signal to the laser control circuit 15 in accordance with the reproduction instruction input from the host.

The laser control circuit 15 drives the semiconductor laser 20 on the basis of the reproduction control signal. In accordance with this, the semiconductor laser 20 generates a reproducing optical beam. The reproducing optical beam generated by the semiconductor laser 20 becomes a parallel beam at the collimate lens 21. The optical beam is made incident on the PBS 22 and passed there through. The optical beam passed through the PBS 22 is passed through the quarter-wave plate 23 and condensed on the information recording surface of the optical disk 11 by the objective lens 24.

The condensed reproducing optical beam is adjusted such that a most desirable optical beam spot is acquired on the information recording surface of the optical disk 11, by the focus control circuit 28, the tracking control circuit 30, the radial tilt control circuit 32, and the objective lens actuator 18.

At this time, the reproducing optical beam applied to the information recording surface of the optical disk 11 is reflected by a reflection film or reflective recording film inside the information recording surface. The reflected optical beam is passed through the objective lens 24 in a reverse direction to become the parallel beam again, passed through the quarter-wave plate 23, and reflected at the PBS 22 which has a polarized beam perpendicular to the incident beam.

The optical beam reflected at the PBS 22 becomes a convergent beam by the condenser lens 25, and is made incident on the photo detector 26. The photo detector 26 is composed of, for example, a photo detector having four divided detecting areas. The luminous flux incident on the photo detector 26 is subjected to photoelectric conversion into an electric signal, which is amplified. The amplified signal is equalized and binaries by the signal processing circuit 16, and then output to the demodulator circuit 17. The signal is subjected to demodulation corresponding to a predetermined modulation scheme in the demodulator circuit 17, and then reproduction data is output there from.

In addition, on the basis of a part of the electric signal output from the photo detector 26, a focus error signal is generated by the focus error signal generating circuit 27. Similarly, on the basis of a part of the electric signal output from the photo detector 26, a tracking error signal is generated by the tracking error signal generating circuit 29. Similarly, on the basis of a part of the electric signal output from the photo detector 26, a radial tilt error signal is generated by the radial tilt error signal generating circuit 31.

The focus control circuit 28 controls the objective lens actuator 18 on the basis of the focus error signal so as to control the focus of the beam spot. The tracking control circuit 30 controls the objective lens actuator 18 on the basis of the tracking error signal so as to control the tracking of the beam spot. The radial tilt control circuit 32 controls the objective lens actuator 18 on the basis of the radial tilt error signal so as to control the radial tilt of the beam spot.

Next, the objective lens actuator 18 according to the embodiment of the present invention is described.

Figure 2:
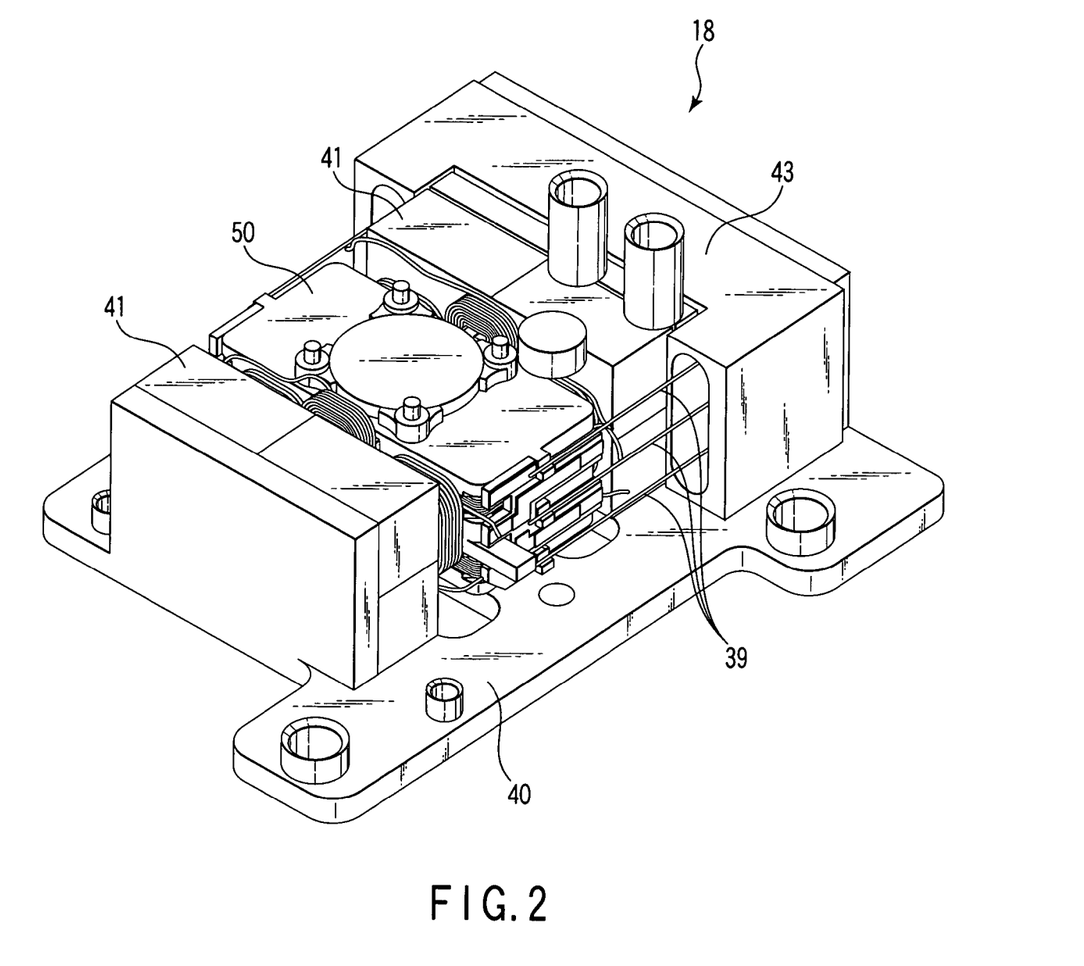
FIG. 2 is an illustration showing an overall structure of objective lens actuator 18.

FIG. 2 is an illustration showing an overall structure of the objective lens actuator 18.

The objective lens actuator 18 consists of a fixed portion and a movable portion. The fixed portion includes a yoke base 40, two magnets 41 and a gel box 43. The yoke base 40 is fixed on a main body of the optical head 12. A lens actuator moving unit 50 is arranged between the magnets 41 and held by a suspension wire 39 which is extended from the gel box 43 fixed on the yoke base 40.

Figure 3:
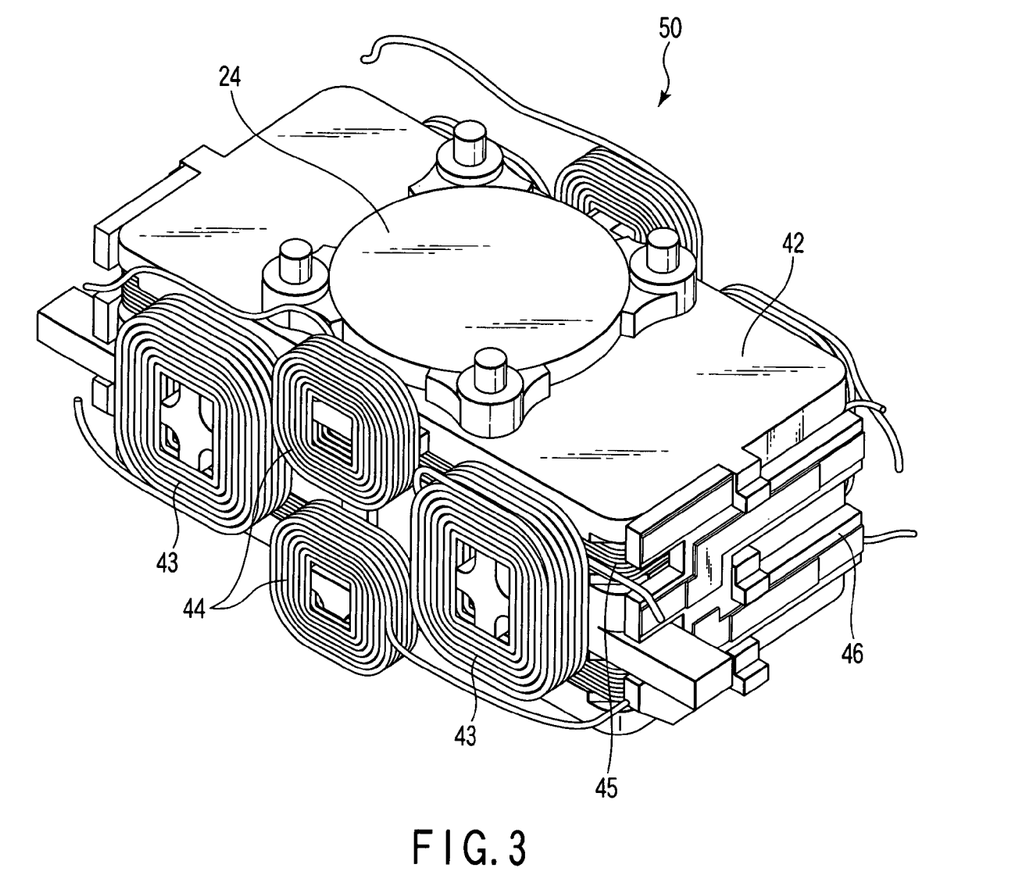
FIG. 3 is an illustration showing a structure of lens actuator moving unit 50.
Figure 4:
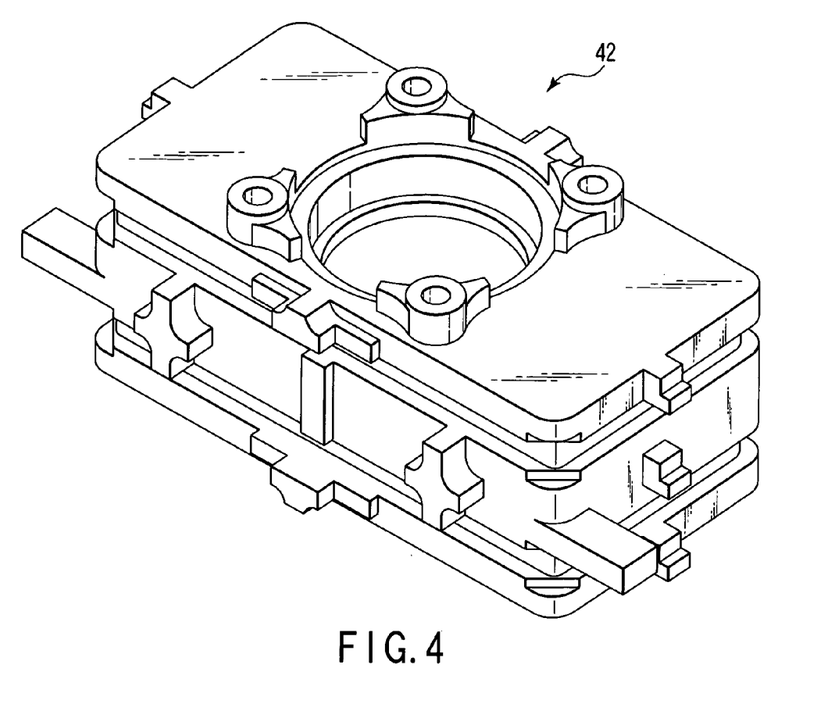
FIG. 4 is an illustration showing a structure of lens holder 42.

FIG. 3 shows a structure of the lens actuator moving unit 50. FIG. 4 shows a structure of a lens holder 42.

Two radial tilt coils 45 are would round the lens holder 42 so as to surround the lens holder 42. Two focusing coils 43 and two tracking coils 44 are provided on either side of the lens holder 42. The focusing coils 43 and the tracking coils 44 on both sides of the lens holder 42 are connected via a junction substrate 46.

Figure 5:
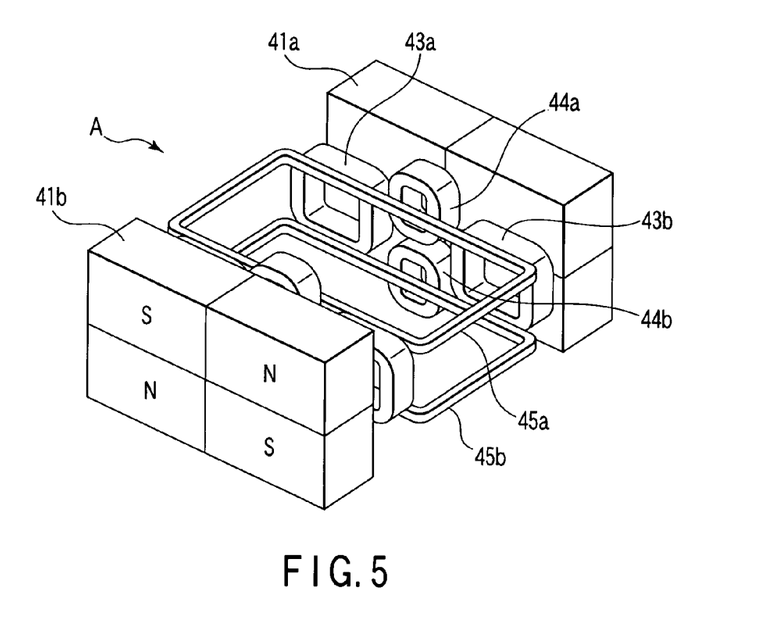
FIG. 5 is an illustration showing a magnetic circuit for the objective lens actuator.
Figure 6:
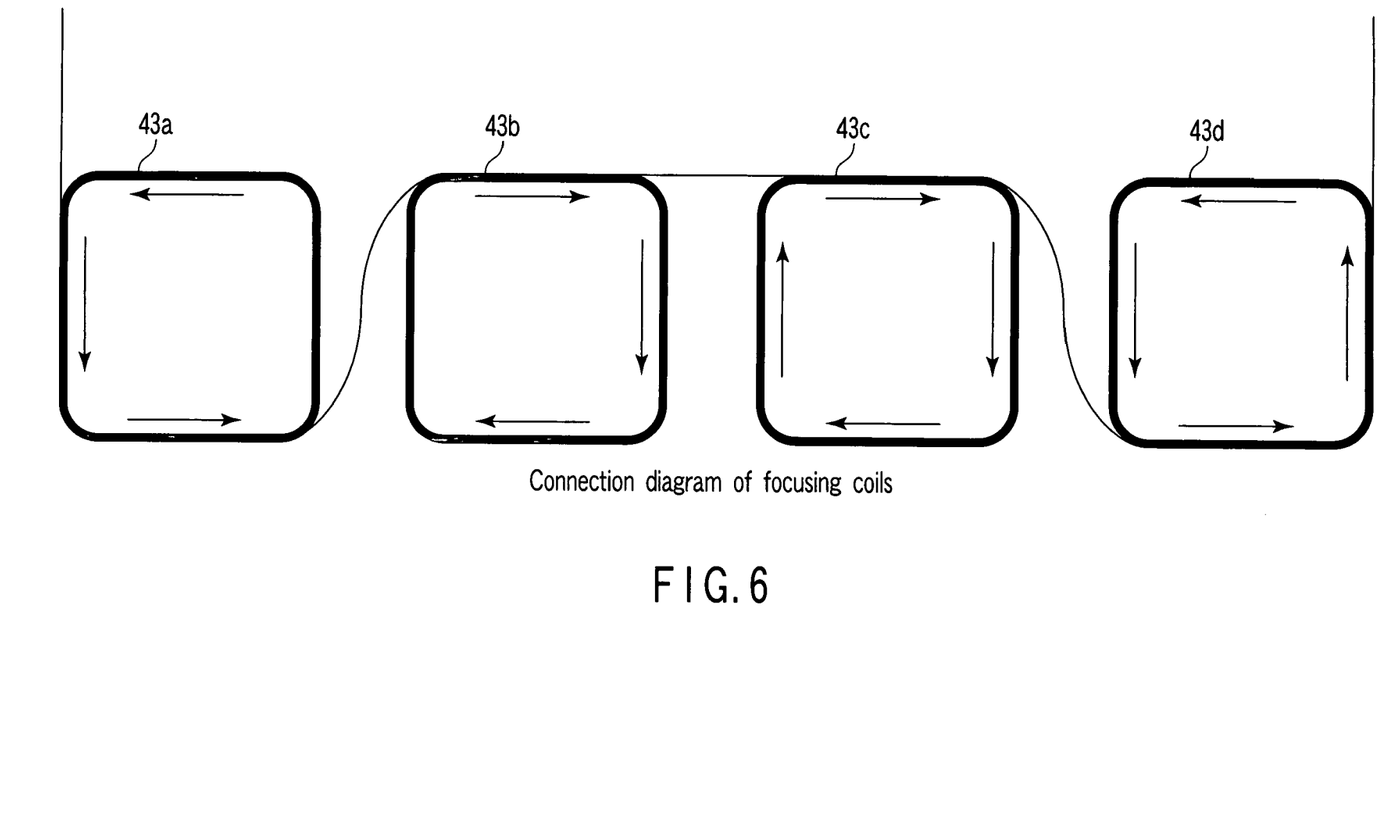
FIG. 6 is a connection diagram of focusing coils.
Figure 7:
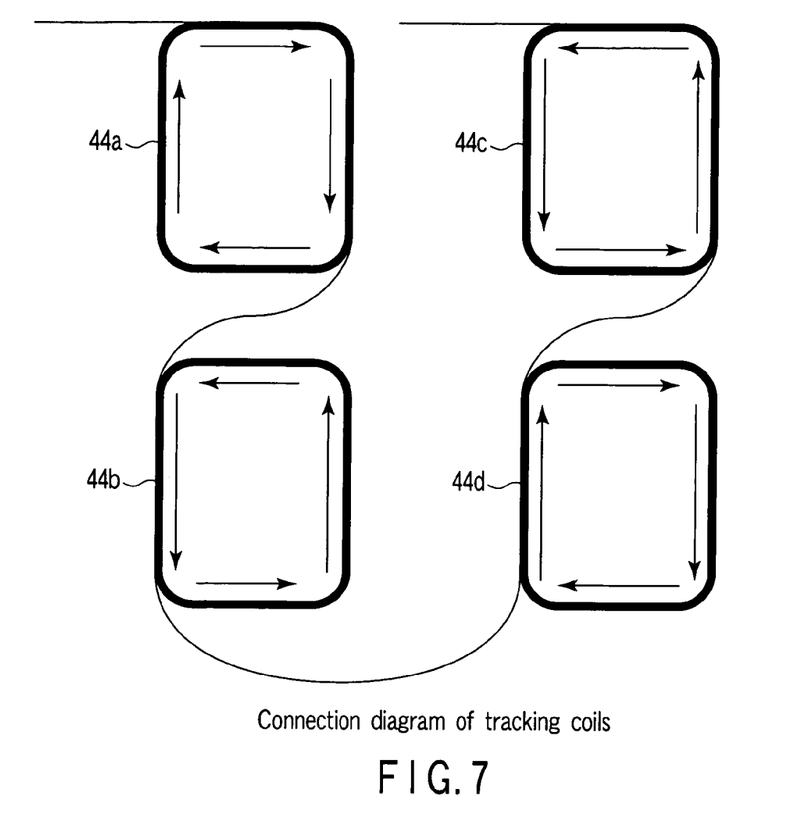
FIG. 7 is a connection diagram of tracking coils.
Figure 8:
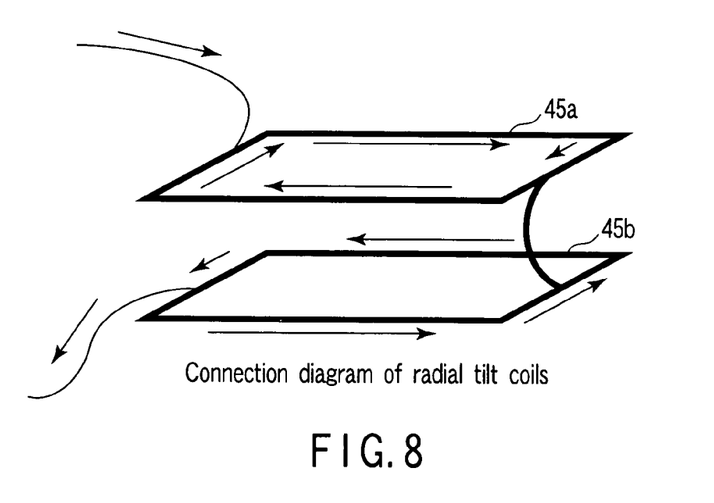
FIG. 8 is a connection diagram of radial tilt coils.

FIG. 5 shows a magnetic circuit for the objective lens actuator, i.e. a relationship in position between the magnets and the coils. FIG. 6 is a connection diagram of focusing coils. FIG. 7 is a connection diagram of tracking coils. FIG. 8 is a connection diagram of radial tilt coils. Arrangement of focusing coils 43a, 43b and tracking coils 44a, 44b on magnet 41a side is the same as that of focusing coils 43c, 43d and tracking coils 44c, 44d on magnet 41b side.

Four focusing coils 43a to 43d are serially connected to each other and receive a drive current from the focus control circuit 28. Four tracking coils 44a to 44d are also serially connected to each other and receive a drive current from the tracking control circuit 30. Moreover, two radial tilt coils 45a, 45b are also serially connected to each other and receive a drive current from the radial tilt control circuit 32.

Next, the arrangement and direction of magnetization of the magnets are described.

Figure 9A:
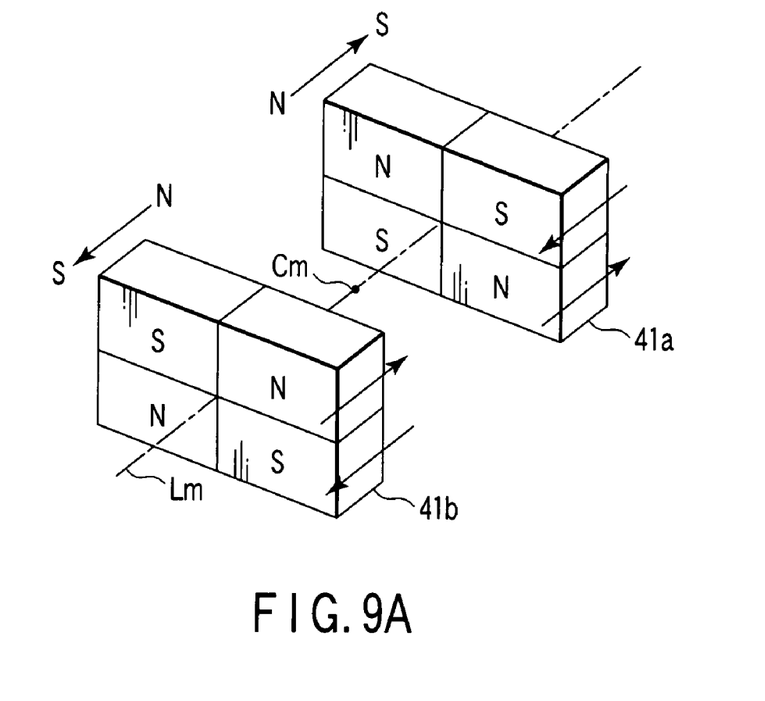
FIG. 9A and FIG. 9B are illustrations showing positions of magnetization and directions of magnetization, of magnets 41a, 41b.
Figure 9B:
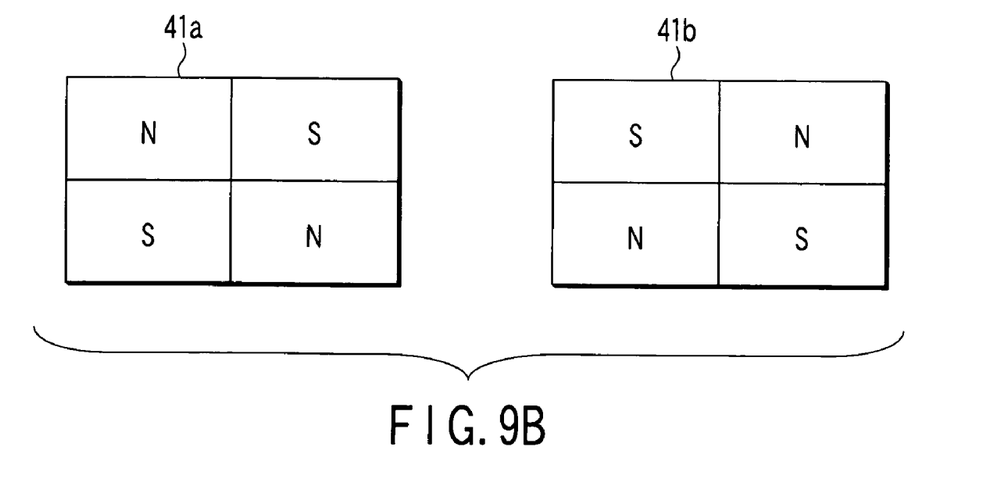

Each of the magnets is shaped in a rectangular parallelepiped as shown in FIG. 9A. A rectangular surface facing the other magnet is divided into four areas, by straight lines which link middle points of opposite sides. The magnets are magnetized such that a direction of magnetization coincide with a thickness direction. As shown in FIG. 9B, each magnet is magnetized such that magnetic poles of adjacent areas are opposite to each other. The magnets 41a, 41b are arranged to sandwich the objective lens or lens holder. Each of the magnets has a size of approximately 9 mm ×6 mm ×2.5 mm.

To drive the actuator in the focus, tracking radial tilt directions, combination of the magnets must be that as shown in FIG. 9. The magnets are quite the same in manner of dividing the areas, but opposite in magnetizing pattern. Thus, the magnets must be manufactured separately. Point Cm is in central line Lm that links centers of the respective magnets 41a, 41b. The distance between the point Cm and the magnet 41a is equal to the distance between the point Cm and the magnet 41b. The central point Cm is called the center of the lens actuator here.

Next, arrangement of the focusing coils and tracking coils is described.

Figure 10:
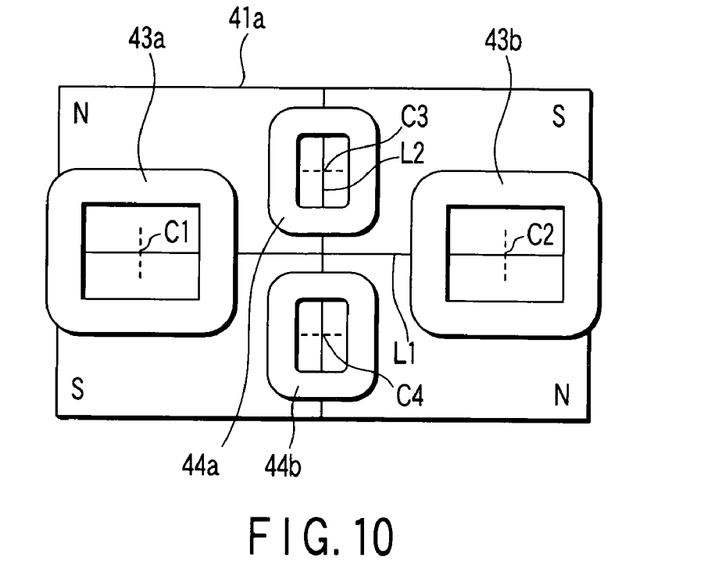
FIG. 10 is a side view of the magnet 41a seen from center Cm of the lens actuator.

Two focusing coils and two tracking coils are arranged on one of sides of the magnet. FIG. 10 is a side view of the magnet 41a seen from the center Cm of the lens actuator (FIG. 9A), i.e. from a direction parallel to the direction of magnetization of the magnet. The magnet 41a, the focusing coils 43a, 43b, and the tracking coil 44b are explained in the following descriptions, but the arrangement of the coils on the magnet 41b side as seen from the center Cm of the lens actuator is the same except that the position of magnetization of the magnet is opposite.

The focusing coils 43a, 43b are arranged laterally and the tracking coils 44a, 44b are arranged longitudinally. The coils are arranged such that a straight line which links center C1 of the focusing coil 43a and center C2 of the focusing coil 43b and a straight line which links center C3 of the tracking coil 44a and center C4 of the tracking coil 44b cross each other. In addition, the coils are arranged such that the straight line which links center C1 of the focusing coil 43a and center C2 of the focusing coil 43b overlaps boundary L1 that divides the magnet 41a into upper and lower parts. Furthermore, the coils are arranged such that the straight line which links center C3 of the tracking coil 44a and center C4 of the tracking coil 44b overlaps boundary L2 that divides the magnet 41a into left and right parts.

Next, the principle of driving the focusing coils is described.

Figure 11:
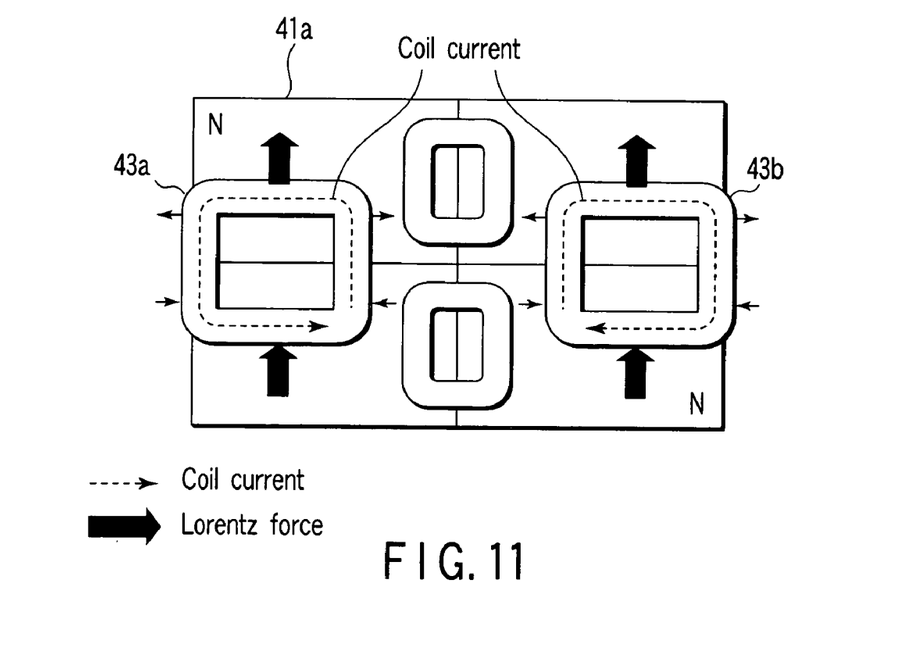
FIG. 11 is an illustration explaining the principle of driving the focusing coils.
Figure 12:
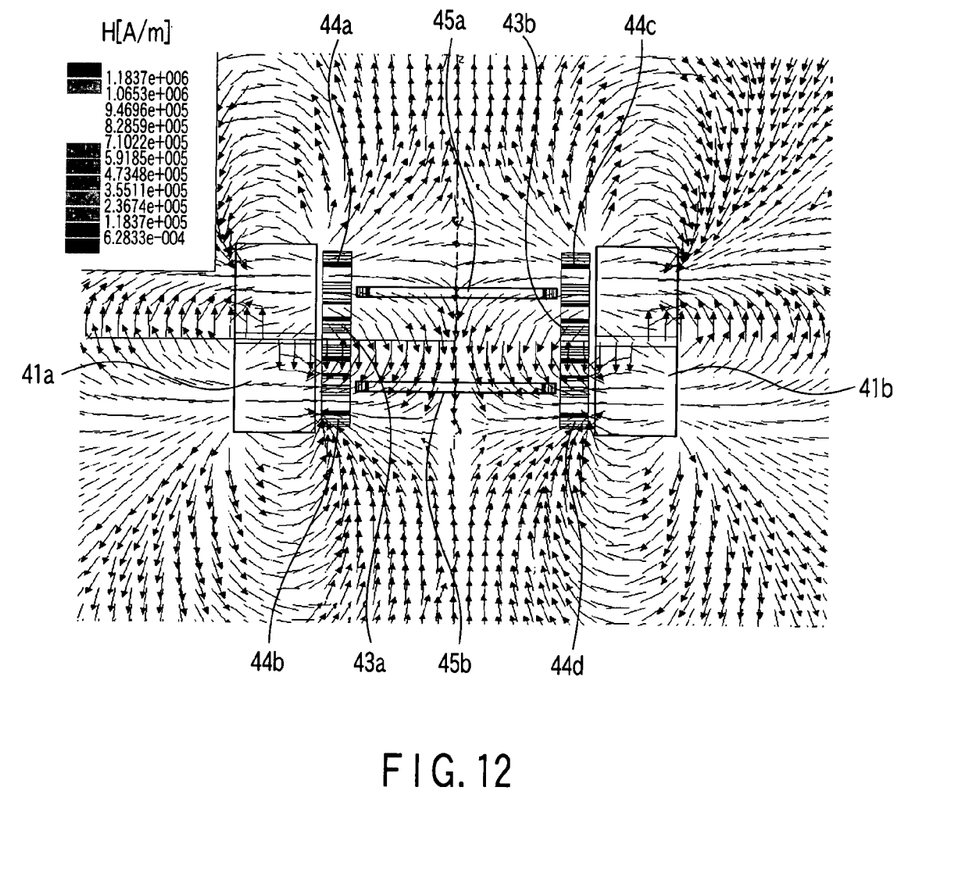
FIG. 12 is a vector diagram of magnetic fields generated by the magnets as seen from side "A" of the lens actuator in FIG. 5.

FIG. 11 is an illustration explaining the principle of driving the focusing coils. FIG. 12 is a vector diagram of magnetic fields generated by the magnets as seen from side "A" of the lens actuator in FIG. 5. It is conceived that a coil current flows in the focusing coils 43a, 43b as shown in FIG. 11. The magnetic field generated from the magnet 41a which faces the focusing coils 43a, 43b is perpendicular to the coils as shown in FIG. 12. The magnetic field is applied from the magnet to the coils at the N pole, and from the coils to the magnet at the S pole. If the left-hand rule is applied to this model, the Lorentz force is applied, in a vertically upward direction as represented by a broad arrow, to each of four horizontally parallel sides of the focusing coils 43a, 43b in FIG. 11. The Lorentz force is also applied in a horizontal direction as represented by a narrow arrow to each of four vertically parallel sides. However, they cancel each other and do not give influence to the resultant of the forces applied in the vertically upward direction. This principle enables the actuator moving unit to be driven in the focusing direction.

The magnetic field of the focusing coils 43a, 43b and the magnet 41a is conceived in FIG. 11. However, the focusing coils 43c, 43d and the magnet 41b which are on the opposite side about the objective lens are arranged similarly, and can generate the driving force in the focusing direction, on quite the same principle.

Next, the principle of driving the tracking coils is described.

Figure 13:
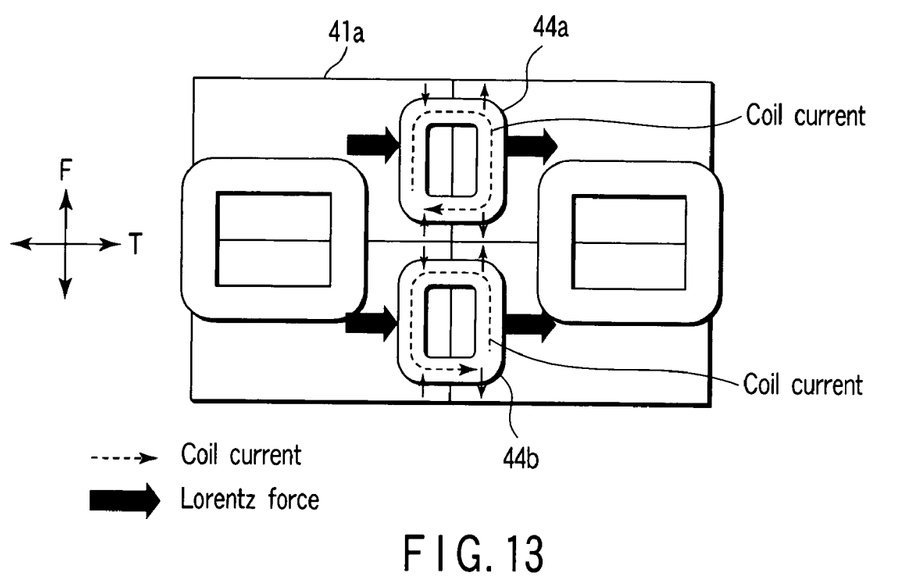
FIG. 13 is an illustration explaining the principle of driving the tracking coils.

FIG. 13 shows the principle of driving the tracking coils. It is conceived that a coil current flows in the tracking coils 44a, 44b as shown in FIG. 13. The magnetic field generated from the magnet 41a which faces the tracking coils 44a, 44b is perpendicular to the coils as shown in FIG. 12. The magnetic field is applied from the magnet to the coils at the N pole, and from the coils to the magnet at the S pole. If the left-hand rule is applied to this model, the Lorentz force is applied, in a horizontally right direction as represented by a broad arrow, to each of four vertically parallel sides of the tracking coils 44a, 44b in FIG. 13. The Lorentz force is also applied in a vertical direction as represented by a narrow arrow to each of four horizontally parallel sides. However, they cancel each other and do not give influence to the resultant of the forces applied in the horizontally right direction. This principle enables the actuator moving unit to be driven in the tracking direction.

The magnetic field of the tracking coils 44a, 44b and the magnet 41a is conceived in FIG. 13. However, the tracking coils 44c, 44d and the magnet 41b which are on the opposite side about the objective lens are arranged similarly, and can generate the driving force in the focusing direction, on quite the same principle.

In FIG. 13, arrow F represents the focusing direction and arrow T represents the tracking direction. Therefore, the direction of magnetization of the magnet 41 is orthogonal to the focusing direction and the tracking direction.

Next, the principle of driving the radial tilt coils is described.

Figure 14:
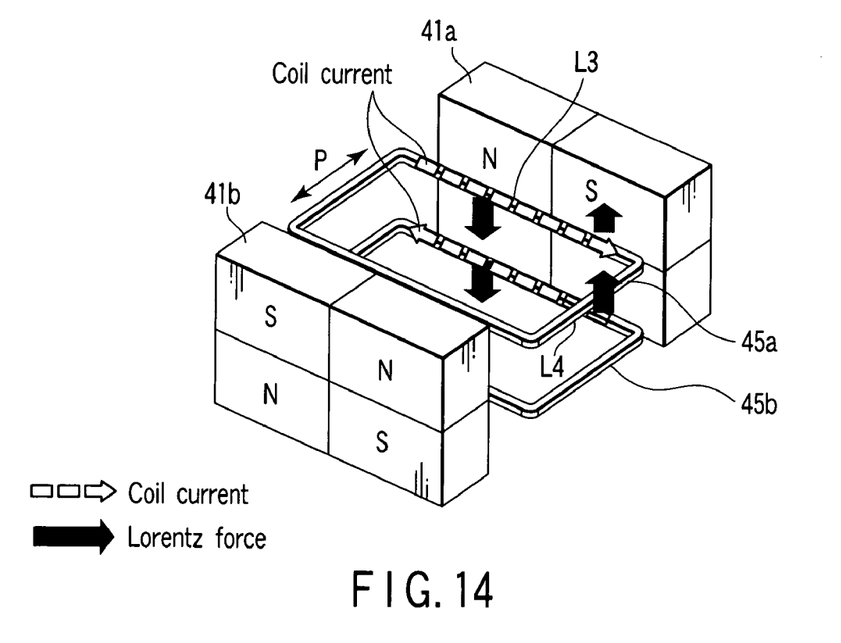
FIG. 14 is an illustration explaining the principle of driving the radial tilt coils.

FIG. 14 shows the principle of driving the radial tilt coils. The radial tilt coils 45a, 45b are arranged between the magnets 41a, 41b so as to surround the objective lens and the lens holder. Each of the radial tilt coils 45a, 45b includes side L3 which extends along the tracking direction T and side L4 which extends in direction P orthogonal to the focusing direction F and tracking direction T.

In FIG. 14, magnetic fields are applied in opposite directions to the left part and the right part, of the side L3 of the radial tilt coils 45a, 45b which is parallel to the magnet, due to the magnetizing pattern of the magnet. If a current flows to the coils in a direction shown in FIG. 14 under this condition, the Lorentz force is generated in vertically opposite directions as represented by broad arrows, on the left part and the right part, of the side L3 of the radial tilt coils 45a, 45b which is parallel to the magnet, due to the left-hand rule. These forces become couples and can generate the torque which can tilt the moving unit of the objective lens actuator in the radial tilt direction.

FIG. 14 illustrates the mechanism of generating the Lorentz force, on one of the sides of the magnet 41a and radial tilt coils 45a, 45b. On quite the same principle, however, the torque can also be generated on the radial tilt coils 45a, 45b and magnet 41b which are arranged at the opposite position about the objective lens.

Figure 15:
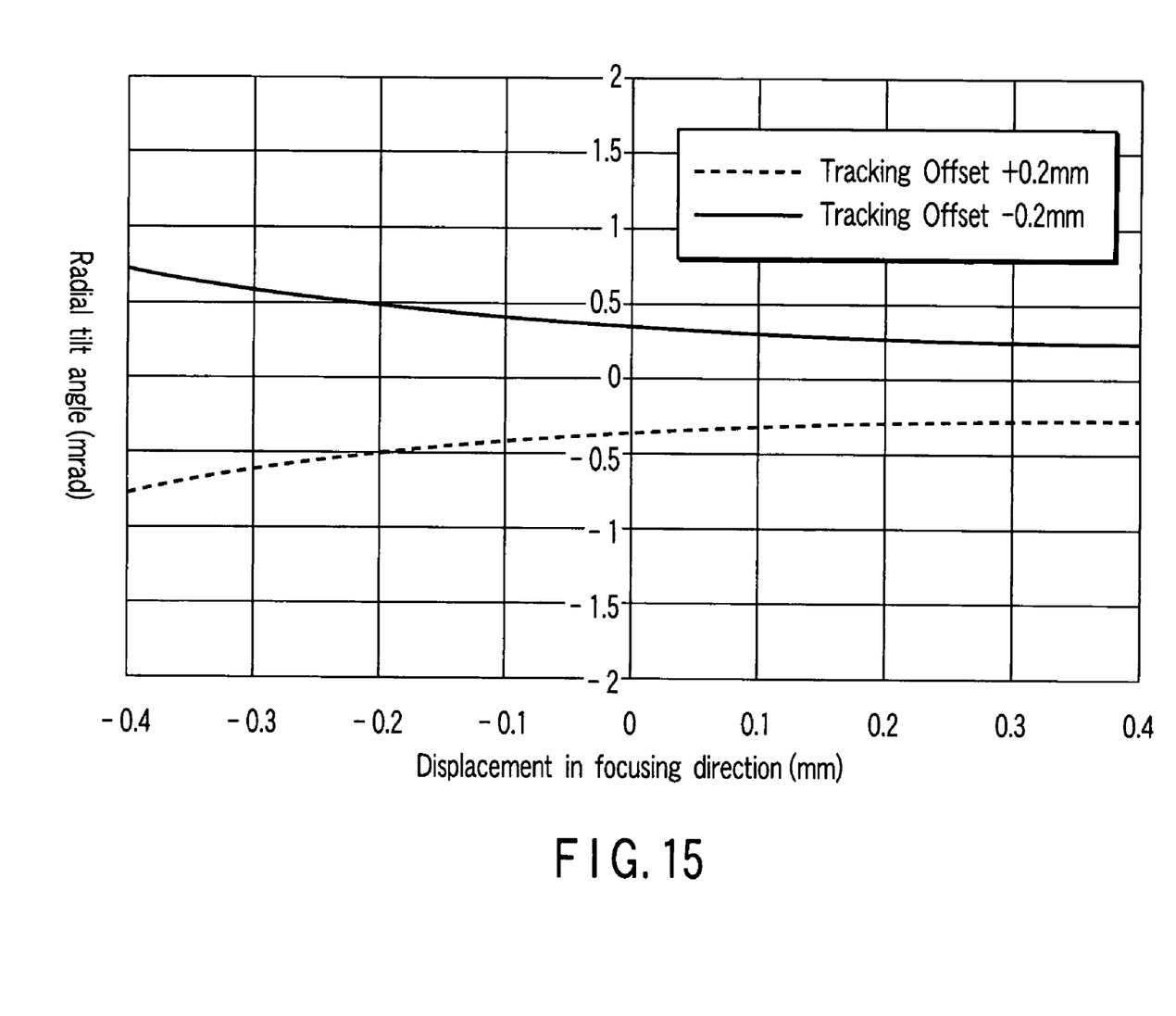
FIG. 15 is a graph showing the characteristics of tilt of the lens actuator moving unit to which the present invention is applied.

FIG. 15 is a graph showing the characteristics of tilt of the lens actuator moving unit to which the present invention is applied. FIG. 15 shows the tilt (radial tilt angle) of the objective lens obtained when the objective lens is displaced by −0.4 mm to +0.4 mm in the focusing direction under the condition that offset displacement of ±0.2 mm is applied to the objective lens in the tracking direction.

In general, in the objective lens actuator, if the objective lens is driven in the focusing direction and the tracking direction, the coil position is changed for the magnet, the force of undesired direction is increased to tilt the objective lens actuator moving unit. In the magnetic circuit of the present invention, however, the tilt of the objective lens is restricted to a small extent as shown in FIG. 15 by improving the magnetizing pattern of the magnet and the arrangement of the focusing coils and tracking coils.

According to the embodiment of the present invention, as described above, a pair of rectangular magnets are provided as fixed units. Each of the magnets, on its rectangular surface which faces the other magnet, is divided into four areas by straight lines which link middle points of opposite sides. The magnet is magnetized such that the adjacent areas have opposite poles N and S. The magnetizing direction is orthogonal to the focusing direction and the tracking direction. Moreover, on the side surface of the moving unit, two focusing coils are arranged in the first direction and two tracking coils are arranged in the second direction that is orthogonal to the first direction. The line segment which links the centers of the respective focusing coils and the line segment which links the centers of the respective tracking coils cross each other. Thus, the driving force can be generated from two sides, of each of the focusing coils and each of the tracking coils and a small actuator having high driving sensitivity can be manufactured. In addition, when the lens is driven, the variation in direction and magnitude of the magnetic field for each of the coils can be made small and unnecessary tilt of the objective lens can be restricted to a small extent.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An objective lens actuator configured to drive an objective lens which condenses a laser beam on an information recording surface of an optical disk, in each of a focusing direction, a tracking direction and a radial tilt direction, comprising:
    a fixed unit which includes first and second magnets, each of the magnets being divided into four areas and being magnetized such that adjacent areas have opposite poles N and S, respectively, a direction of the magnetization being orthogonal to the focusing direction and tracking direction; and
    a moving unit which is arranged between the first and second magnets and includes the objective lens, focusing coils, tracking coils, and a radial tilt coil.

2. The objective lens actuator according to claim 1, wherein on a side surface of the moving unit, two focusing coils are arranged in a first direction and two tracking coils are arranged in a second direction orthogonal to the first direction, and a line segment which links centers of the respective focusing coils and a line segment which links centers of the respective tracking coils cross each other.

3. The objective lens actuator according to claim 2, wherein the focusing coils and the tracking coils are arranged such that the centers of the focusing coils and the centers of the tracking coils overlap boundaries of the divided areas as seen from the direction of magnetization of the magnet.

4. The objective lens actuator according to claim 2, wherein the radial tilt coil is arranged to surround the moving unit and includes a side extending in the tracking direction and a side extending in a direction orthogonal to the focusing direction and tracking direction.

5. An optical disk apparatus comprising:
    an objective lens actuator configured to drive an objective lens which condenses a laser beam on an information recording surface of an optical disk, in each of a focusing direction, a tracking direction and a radial tilt direction,
    the lens actuator comprising
    (i) a fixed unit including first and second magnets, and
    (ii) a moving unit being arranged between the first and second magnets and including the objective lens, focusing coils, tracking coils, and a radial tilt coil, each of the magnets being divided into four areas and being magnetized such that adjacent areas have opposite poles N and S, respectively, a direction of the magnetization being orthogonal to the focusing direction and tracking direction;
    a focus control unit configured to control focus of the laser beam by using the objective lens actuator;
    a tracking control unit configured to control tracking of the laser beam by using the objective lens actuator; and
    a radial tilt control unit configured to control radial tilt of the laser beam by using the objective lens actuator.

* * * * *